US006217180B1

(12) United States Patent
Eisenbraum

(10) Patent No.: US 6,217,180 B1
(45) Date of Patent: Apr. 17, 2001

(54) REARVIEW MIRROR FOR BABY STROLLER

(75) Inventor: Kenneth D. Eisenbraum, Troy, MI (US)

(73) Assignee: United Global Sourcing, Inc., Troy, MI (US)

(\*) Notice: Subject to any disclaimer, the term of this patent is extended or adjusted under 35 U.S.C. 154(b) by 0 days.

(21) Appl. No.: 09/420,973

(22) Filed: Oct. 20, 1999

Related U.S. Application Data

(60) Provisional application No. 60/104,986, filed on Oct. 20, 1998.

(51) Int. Cl.[7] .................................................. G02B 7/182
(52) U.S. Cl. ........................... 359/871; 359/872; 359/882
(58) Field of Search ..................................... 359/871, 872, 359/882; 248/476, 477, 482, 495, 496, 497

(56) References Cited

U.S. PATENT DOCUMENTS

| 564,454 | 7/1896 | Ryan ..................................... 248/484 |
| 638,100 | 11/1899 | Courtney ............................. 280/647 |
| 1,345,157 | 6/1920 | Francisco ............................ 248/479 |
| 1,750,947 | 3/1930 | Vons .................................... 248/486 |
| 2,054,967 | 9/1936 | Dahl ..................................... 280/644 |
| 2,442,620 | 6/1948 | Simpson ............................... 280/644 |
| 2,488,450 | 11/1949 | Underwood ........................... 280/36 |
| 2,910,915 | 11/1959 | Harris ..................................... 88/77 |
| 3,448,558 | 6/1969 | Hurtle ................................... 53/141 |
| 4,062,555 | 12/1977 | Peng et al. ............................ 280/42 |
| 4,065,177 | 12/1977 | Hyde et al. ........................... 297/327 |
| 4,072,318 | 2/1978 | Laune ..................................... 280/42 |
| 4,116,465 | 9/1978 | Maclaren ............................ 280/647 |
| 4,359,266 | 11/1982 | Rohlf et al. ......................... 359/881 |
| 4,422,615 | \* 12/1983 | McManus ....................... 248/475 R |
| 4,902,118 | 2/1990 | Harris .................................. 359/881 |
| 4,909,618 | 3/1990 | Gardner ............................... 359/881 |
| 5,104,157 | \* 4/1992 | Bahner ................................. 285/307 |
| 5,259,582 | \* 11/1993 | DeLange, III ...................... 248/481 |
| 5,285,321 | 2/1994 | Nolan-Brown ..................... 359/857 |
| 5,996,190 | \* 12/1999 | Peterson .............................. 24/457 |
| 6,031,178 | \* 2/2000 | Kester .................................. 136/245 |

\* cited by examiner

Primary Examiner—Mohammad Sikder
(74) Attorney, Agent, or Firm—Gifford, Krass, Groh, Sprinkle, Anderson & Citkowski, P.C.

(57) ABSTRACT

A rearview mirror assembly for a baby stroller, carriage and the like is disclosed including mirror that is removably attached to a clamp by an elongated rod. The clamp attaches to the structure of a stroller or carriage and includes a conical male fastener member. A female fastener member secured to the rod at the end opposite the mirror is adapted to slip over the male fastener and lock into a removably attachable arrangement with the clamp.

8 Claims, 3 Drawing Sheets

REARVIEW MIRROR FOR BABY STROLLER

CROSS-REFERENCE TO RELATED APPLICATIONS

This application claims the benefit of U.S. Provisional Application having Ser. No. 60/104,986 filed Oct. 20, 1998.

BACKGROUND OF THE INVENTION

1. Field of the Invention

The present invention relates to a mirror. More particularly, the present invention concerns a mirror adapted to be removably attached to a stroller or baby carriage to allow the person pushing the stroller to view the baby's face and to give the baby a reciprocal view of the person pushing.

2. Brief Description of the Related Art

A substantial number of today's baby carriages and strollers are configured to allow the child or children a forward looking view. However, while a forward view does provide the infant with the best possible view and the ability to survey the environment, a clear disadvantage of this traditional arrangement is that the infant is unable to maintain visual contact with the parent or guardian pushing the stroller or carriage.

Some advantages of a rearview mirror for a baby stroller are detailed in U.S. Pat. No. 4,359,266, issued Nov. 16, 1982, to Rohlf et al. The '266 patent discloses a rearview mirror assembly for a collapsible stroller. The mirror includes a rigid extension member having a bracket at one end for attachment of the assembly to the stroller and a rearview mirror at the other end of the extension member that permits the infant and guardian to view to maintain visual contact. One disadvantage of the '266 patent is that the manner of attachment of the mirror to the bracket mandates that the entire assembly be either attached to or removed from a stroller as a single unit. Such an arrangement will result in difficulty to the user throughout the course of a typical day when, for example, obstacles such as doors, door handles and chairs may impede the progress of the stroller by catching, bumping, or misaligning the prior art mirror.

BRIEF SUMMARY OF THE INVENTION

The present invention overcomes many disadvantages found in the prior art through innovations in adaptability and flexibility. The present invention for a rearview mirror assembly for a baby stroller, carriage and the like includes a preferably convex mirror removably attached to a clamp by an elongated flexible gooseneck. The clamp attaches to the structure of a stroller or carriage and includes a conical male fastener member. A female fastener member secured to the gooseneck rod at the end opposite the mirror is adapted to slip over the male fastener and lock into a removably attachable arrangement with the clamp.

DETAILED DESCRIPTION OF THE INVENTION

This invention relates to a mirror, preferably convex, so as to provide a wide angle view, adapted to be removably attached to a bar forming one of the structural elements of a stroller or carriage for babies to allow the person pushing the stroller to view the baby's face and to give the baby a reciprocal view of the person pushing.

The mirror assembly consists of two portions which may be readily attached and detached from one another without the need for any tools. The first part consists of a "C" clamp formed with a tightening screw with an enlarged handle at its outer side. When opened, the clamp may be fitted over a front or a side bar of a stroller or carriage. The handle is then rotated to move the screw toward an opposing side of the clamp and lock the clamp into place over the bar. The clamp preferably is formed of hard plastic with a resilient inner liner to secure the bar in place.

The clamp includes a tapered male fastener integrally formed and projecting outwardly from the closed side of the C, transversely to the direction of movement of the screw lock. The second section of the assembly, including the mirror, may be removably attached to the clamp and the stroller by use of this fastener. The second part of the assembly includes a female fastener which extends over the male fastener and has an inwardly extending dimple which engages a complementary depression in the male member to lock the mirror in place on the clamp. The female fastener has a concavely curved surface which is adapted to engage the convexly curved outer surface of the clamp when the fastener is locked into place to align the mirror assembly relative to the clamp and to align the dimple on the interior of the female fastener element with the depression on the male fastener element.

An elongated, flexible gooseneck rod has one end attached to the end of the female connector opposite to the end which attaches to the clamp. The gooseneck may be manually bent to a desired alignment and orientation and will retain that position. A convex mirror is attached to the other end of the gooseneck rod. The rod is preferably about 3–8 inches in length.

Figure 1:
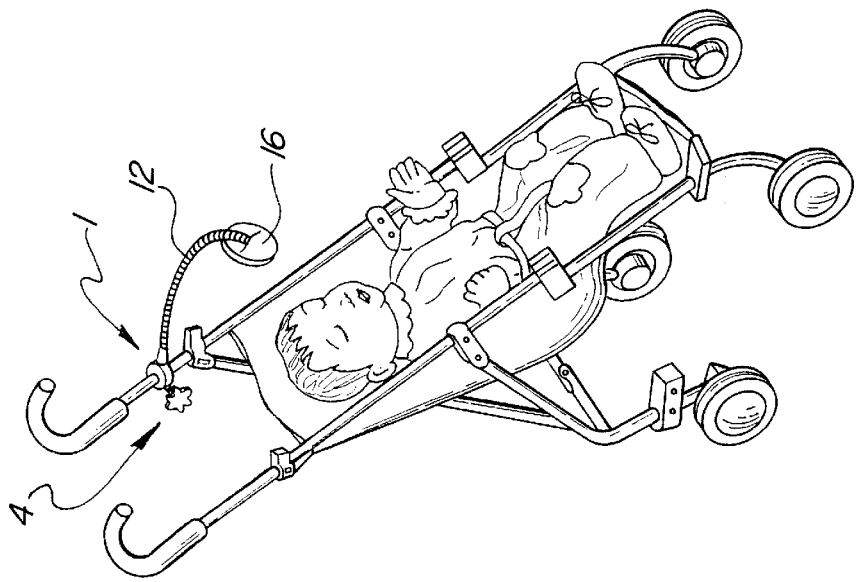
FIG. 1 is a perspective environmental view of the invention of a rearview mirror constructed in accordance with the present invention.

As seen in FIG. 1, in use the clamp is attached to a front or side stroller bar or an equivalent structure on a carriage at a point forward of the baby's head when seated in the stroller or carriage. The screw clamp is securely tightened. The clamp will be normally retained in place on the stroller even when the mirror and gooseneck section is removed for storage or the like. The female fastener on one end of the gooseneck is then secured to the male fastener on the clamp and the gooseneck is adjusted so that the mirror reflects the forward view of the baby's head to a person pushing the stroller or carriage and, reciprocally, an image of the pusher to the baby.

A preferred embodiment of the invention is illustrated in the attached drawings which constitute an exploded of the mirror assembly from the rear and the side.

Figure 2:
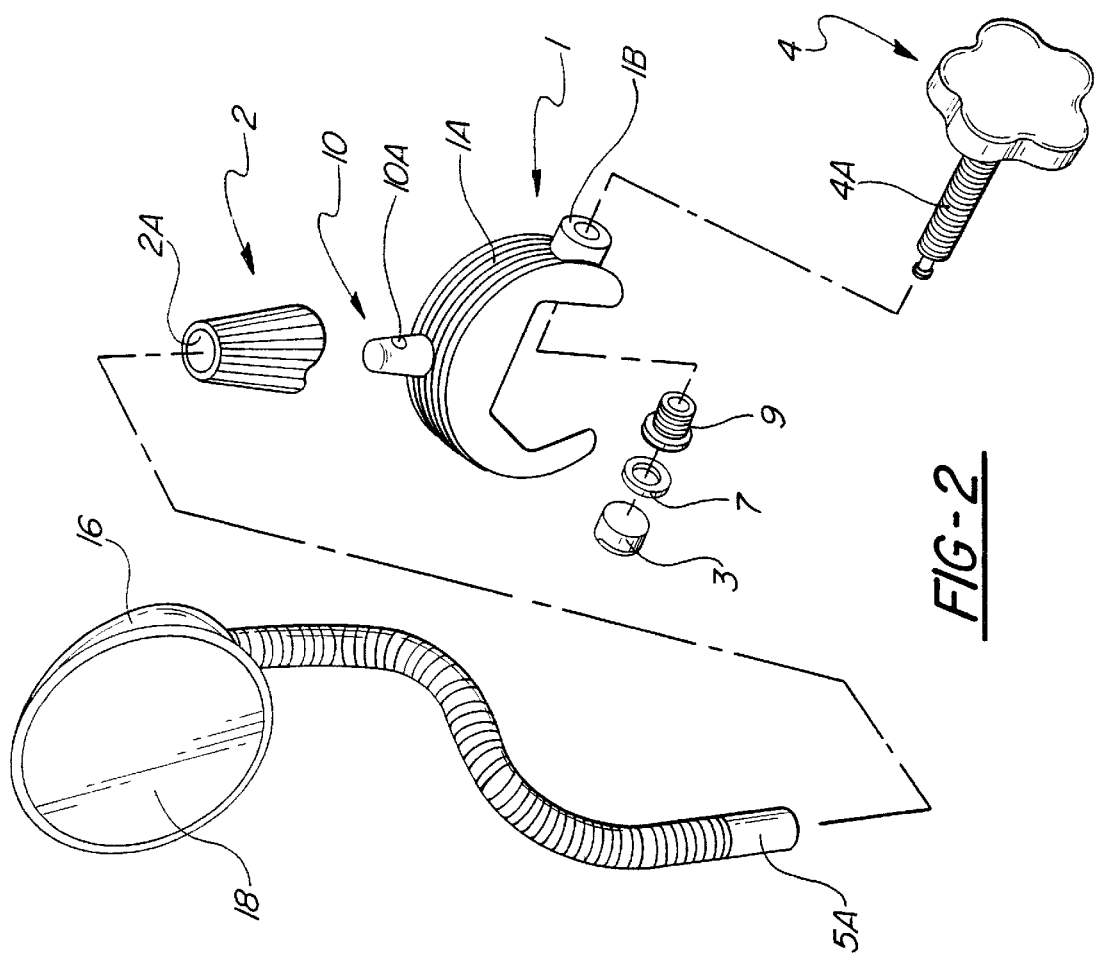
FIG. 2 is an exploded perspective view of the present invention.
Figure 3:
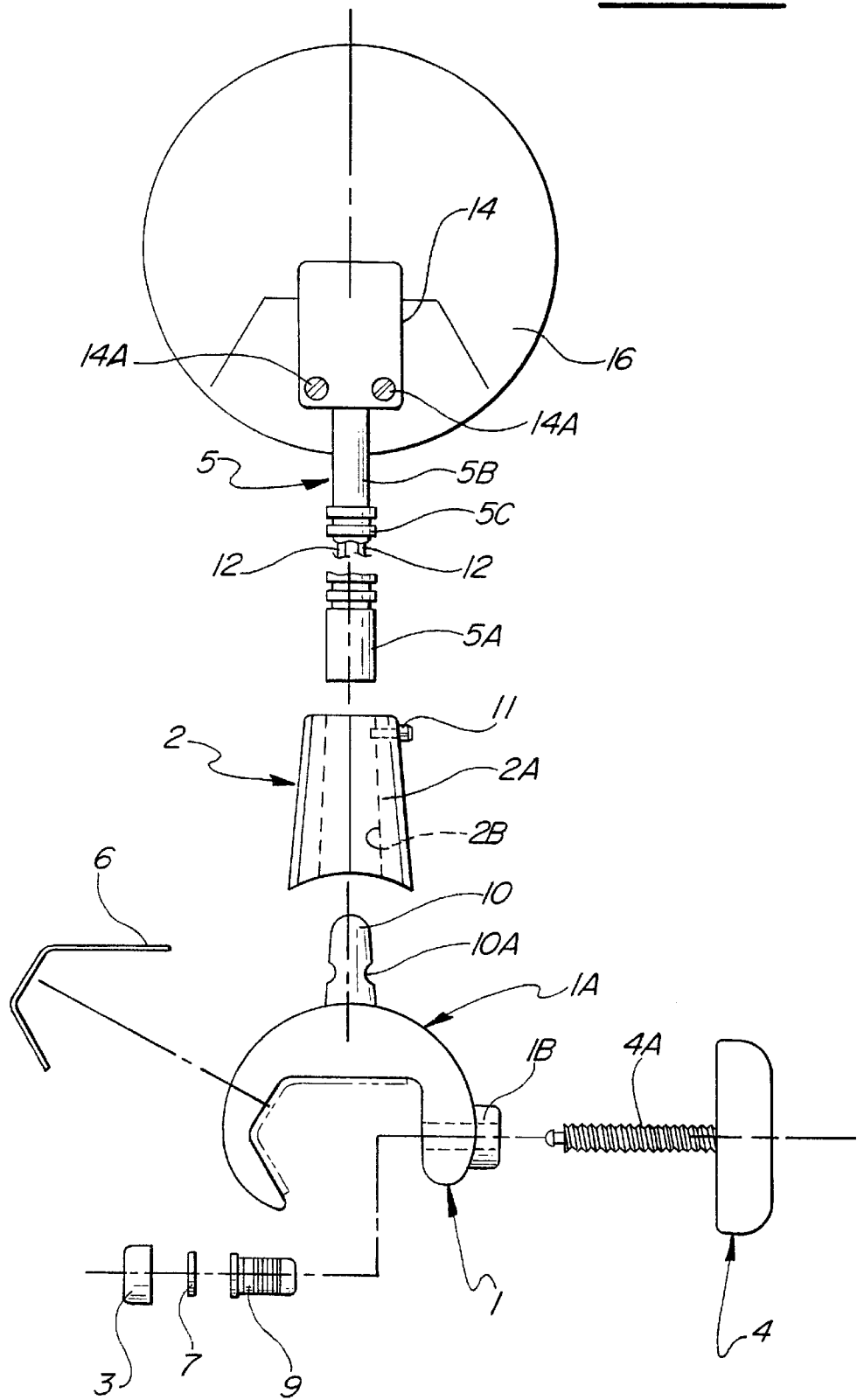
FIG. 3 is a rear exploded planar view of the present invention.

As seen in FIGS. 1, 2, and 3, the C-clamp body 1 has a sheet of elastomer 6 adhered to its internal clamping surface. The elastomer preferably has a pressure sensitive adhesive coating on the side which engages the clamp surface. The clamp 1 has a rounded outer surface 1A and a threaded hole 1B lined by a metallic insert which is adapted to receive an elongated clamping screw 4A having a handle 4 at its outer end. A clamping end 3 is suitably secured to the screw on the interior side of the clamp, after the screw 4A is threaded into the insert 1B.

Figure 4:
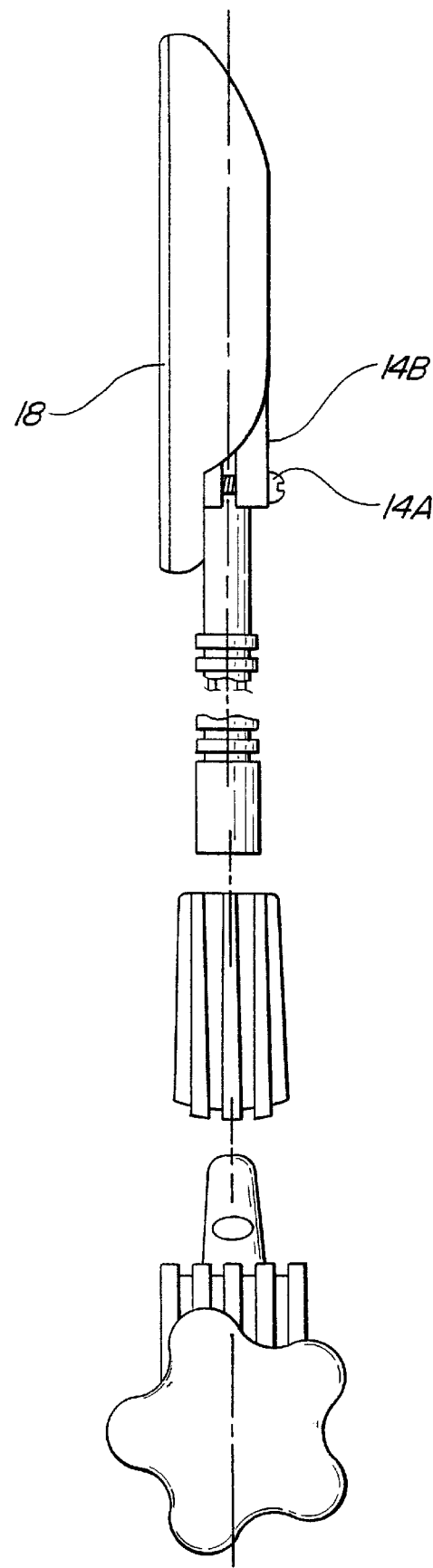
FIG. 4 is a side exploded planar view of the present invention

Referring to FIGS. 2, 3 and 4, a conical male fastener member 10 is integrally formed with the clamp body 1A at the center of its convexly curved surface so as to project away from the clamping section.

A female fastener member 2 having a conically shaped internal bore 2A formed with an inwardly projecting dimple 2B is adapted to slip over the male fastener 10 so that the dimple 2B readily locks in a depression 10A formed at the base of the male fastener. An elongated gooseneck 5 has a cylindrical section 5A which is adapted to be secured within the small end of the tapered recess 2A and locked into position by a screw 11 which passes through the wall of the female fastener. The elongated section of the gooseneck is preferably formed of a resilient plastic in which one or two elongated, bendable metal rods 12 are embedded. The rods 12 give the gooseneck its ability to retain a fixed position and they are preferably formed of soft wire. The opposite end of the gooseneck 5 to the end retained within the female fastener 2 consists of a cylindrical section 5B which is locked within a clamp 14 formed in the rear surface of the mirror body 16 by a pair of screws 14A. As is best seen in the side view, the screws 14A straddle the sides of a central cavity which receives the section 5B. The clamp is formed by a integrally molded cantilever section 14B which is pressed toward the base of the clamp by tightening the screws 14A so as to lock the cylindrical section 5B of the gooseneck into place. A convex mirror of circular configuration 18 is retained in the forward face of the mirror housing 16.

The central portion of the gooseneck is formed with circular ridges in a corrugation formation as at 5C for both aesthetic purposes and to increase the resiliency of the outer plastic shell. The female fastener 2 and the outer surface of the clamp 1 are both formed by similar decorative ridges.

Having thus disclosed my invention, it will become apparent to those skilled in the art that other embodiments of the invention may be conceived or constructed without departing from the scope of the present invention.

I claim:

1. A mirror apparatus for attachment to a baby stroller comprising:

A. a clamp assembly removably affixed to said baby stroller, said clamp assembly having an outer surface and a male fastener projecting from said outer surface, and;

B. a mirror assembly, said mirror assembly comprising a second fastener removably secured to said male fastener, an elongated rod having one end attached to the second fastener and a mirror secured to the opposite end of said rod.

2. The mirror assembly of claim 1, wherein the clamp assembly further comprises a C-clamp.

3. The claim of claim 2, wherein the clamp further comprises a resilient inner liner.

4. The clamp assembly of claim 1, wherein said male fastener has a substantially conical shape.

5. The mirror assembly of claim 1, wherein said second fastener further comprises a female fastener.

6. The mirror assembly of claim 5, wherein said fastener further comprises a female fastener having a substantially conical inner cavity.

7. The mirror assembly of claim 1, wherein the elongated rod further comprises a flexible gooseneck.

8. The mirror assembly of claim 1, wherein the mirror further comprises a convex mirror.

* * * * *